United States Patent
Sohn et al.

(10) Patent No.: US 11,569,577 B2
(45) Date of Patent: Jan. 31, 2023

(54) ANTENNA MODULE COMPRISING SHIELD LAYER AND WIRELESS POWER RECEIVING DEVICE

(71) Applicant: LG INNOTEK CO., LTD., Seoul (KR)

(72) Inventors: In Seong Sohn, Seoul (KR); Dong Hyeok Choi, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 386 days.

(21) Appl. No.: 16/963,961

(22) PCT Filed: Jan. 29, 2019

(86) PCT No.: PCT/KR2019/001222
§ 371 (c)(1),
(2) Date: Jul. 22, 2020

(87) PCT Pub. No.: WO2019/151746
PCT Pub. Date: Aug. 8, 2019

(65) Prior Publication Data
US 2021/0044019 A1 Feb. 11, 2021

(30) Foreign Application Priority Data

Jan. 30, 2018 (KR) .................. 10-2018-0011306

(51) Int. Cl.
*H02J 50/70* (2016.01)
*H01Q 7/04* (2006.01)
(Continued)

(52) U.S. Cl.
CPC .............. *H01Q 7/04* (2013.01); *H01F 27/25* (2013.01); *H01F 27/366* (2020.08);
(Continued)

(58) Field of Classification Search
CPC .......... H01Q 7/04; H01Q 1/2208; H01Q 1/38; H01Q 7/08; H01F 27/25; H01F 27/366;
(Continued)

(56) References Cited

U.S. PATENT DOCUMENTS

| 2011/0210696 A1* | 9/2011 | Inoue | H01F 38/14 320/108 |
| 2013/0285604 A1* | 10/2013 | Partovi | H02J 50/70 320/108 |

FOREIGN PATENT DOCUMENTS

| JP | 2004-140026 | 5/2004 |
| KR | 10-1990-0008719 | 6/1990 |

(Continued)

OTHER PUBLICATIONS

International Search Report dated May 10, 2019 issued in Application No. PCT/KR2019/001222.

*Primary Examiner* — Paul Dinh
(74) *Attorney, Agent, or Firm* — Ked & Associates, LLP

(57) ABSTRACT

An antenna module according to one embodiment of the present invention, comprises: a coil layer including a wound first coil; a shield layer disposed on the coil layer and including a plurality of sequentially stacked magnetic sheets; and a protection layer disposed on the shield layer, wherein the thickness of an edge of the shield layer is greater than the thickness of the center of the shield layer, and the total separation distance between the plurality of magnetic sheets at the edge of the shield layer is greater than the total separation distance between the plurality of magnetic sheets at the center of the shield layer.

20 Claims, 5 Drawing Sheets

(51) Int. Cl.
    *H01F 27/25* (2006.01)
    *H01Q 1/22* (2006.01)
    *H01Q 1/38* (2006.01)
    *H01Q 7/08* (2006.01)
    *H01F 27/36* (2006.01)
    *H01F 38/14* (2006.01)

(52) U.S. Cl.
    CPC ............. *H01Q 1/2208* (2013.01); *H01Q 1/38* (2013.01); *H01Q 7/08* (2013.01); *H02J 50/70* (2016.02); *H01F 27/36* (2013.01); *H01F 38/14* (2013.01)

(58) Field of Classification Search
    CPC ........ H01F 27/36; H01F 38/14; H01F 27/255; H01F 10/08; H02J 50/70; H02J 50/10; H02J 50/80; H04B 5/0037
    USPC ......................................................... 320/108
    See application file for complete search history.

(56) References Cited

FOREIGN PATENT DOCUMENTS

| KR | 10-1513052 | 4/2015 |
| KR | 10-2016-0094242 | 8/2016 |
| KR | 10-2018-0000490 | 1/2018 |

\* cited by examiner

【FIG. 1】
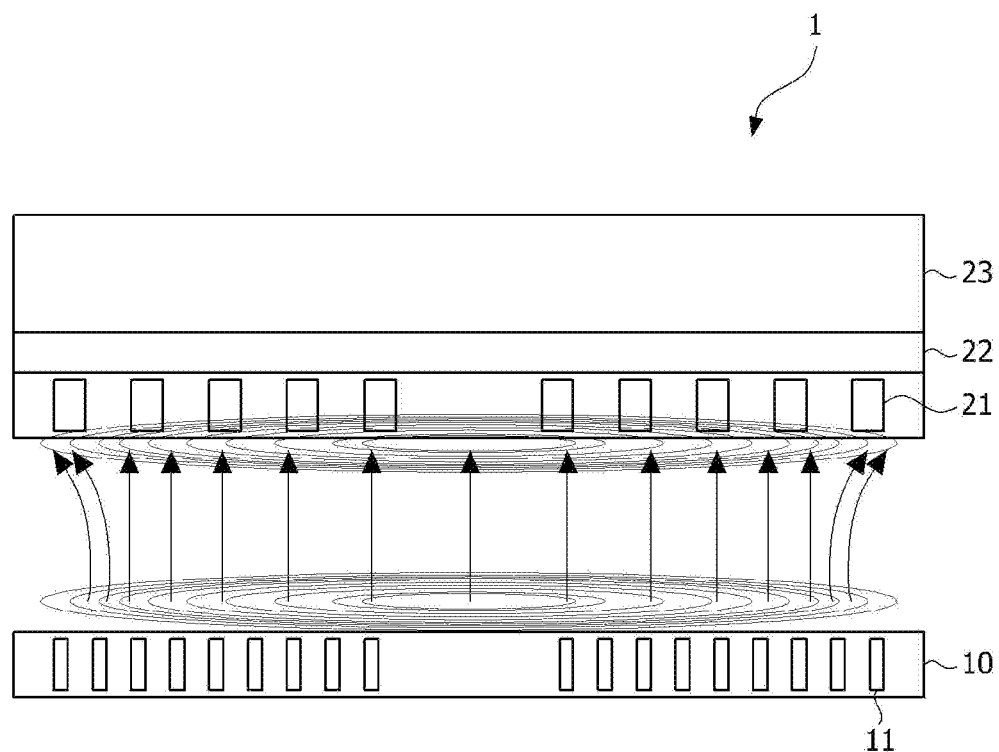
【FIG. 2】
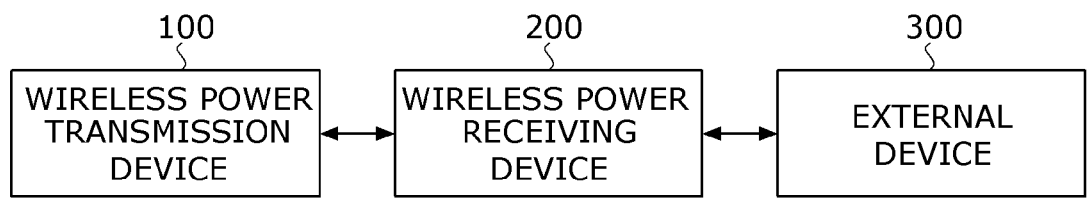

【FIG. 3】
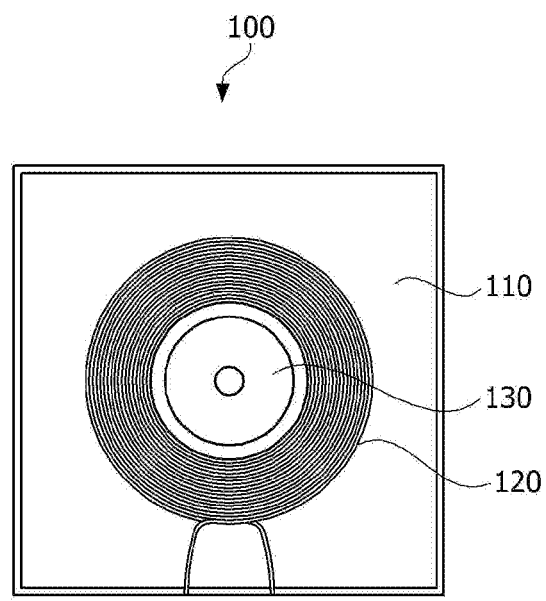
【FIG. 4】
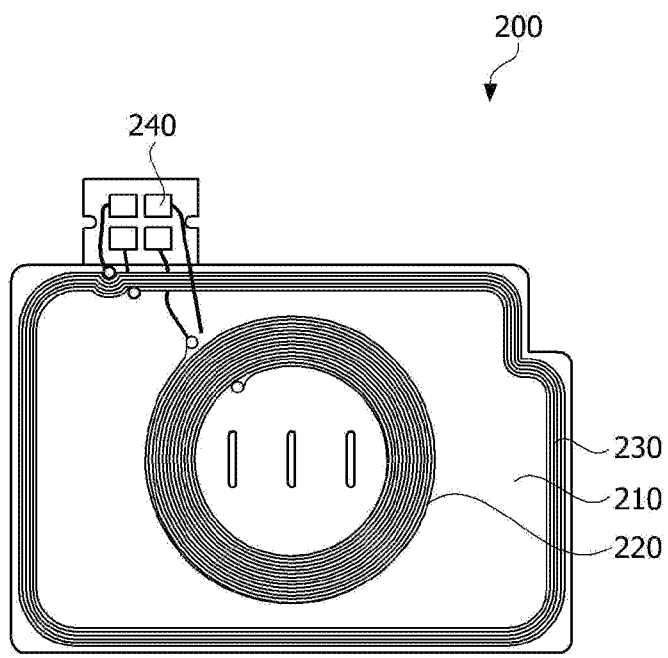

[FIG. 5]
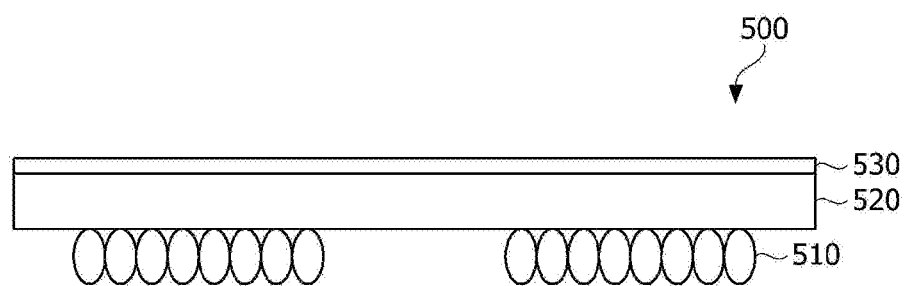
[FIG. 6]
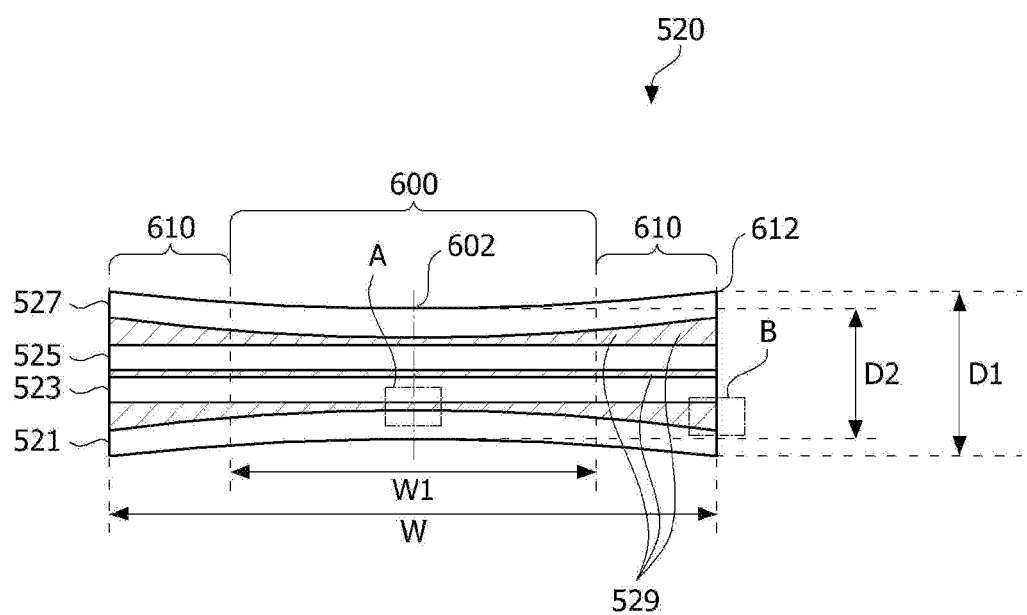

【FIG. 7A】
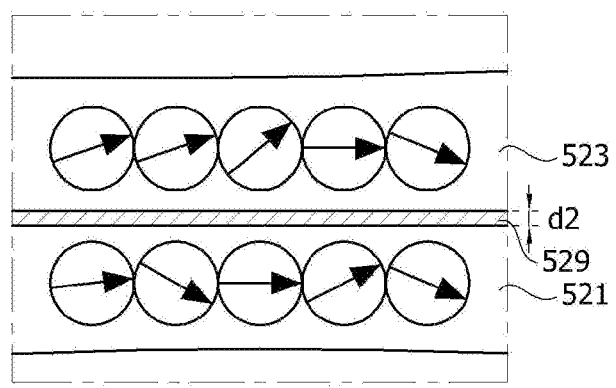
【FIG. 7B】
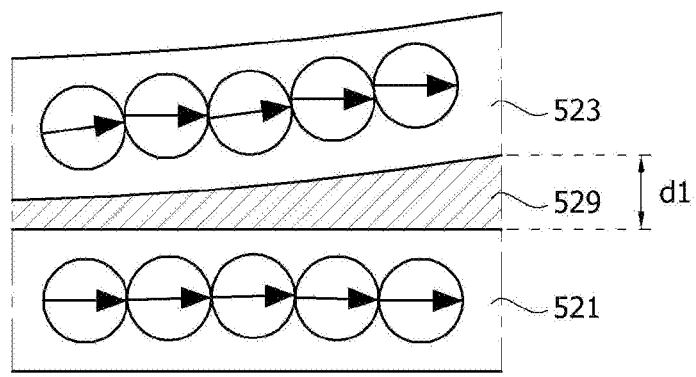

[FIG. 8]
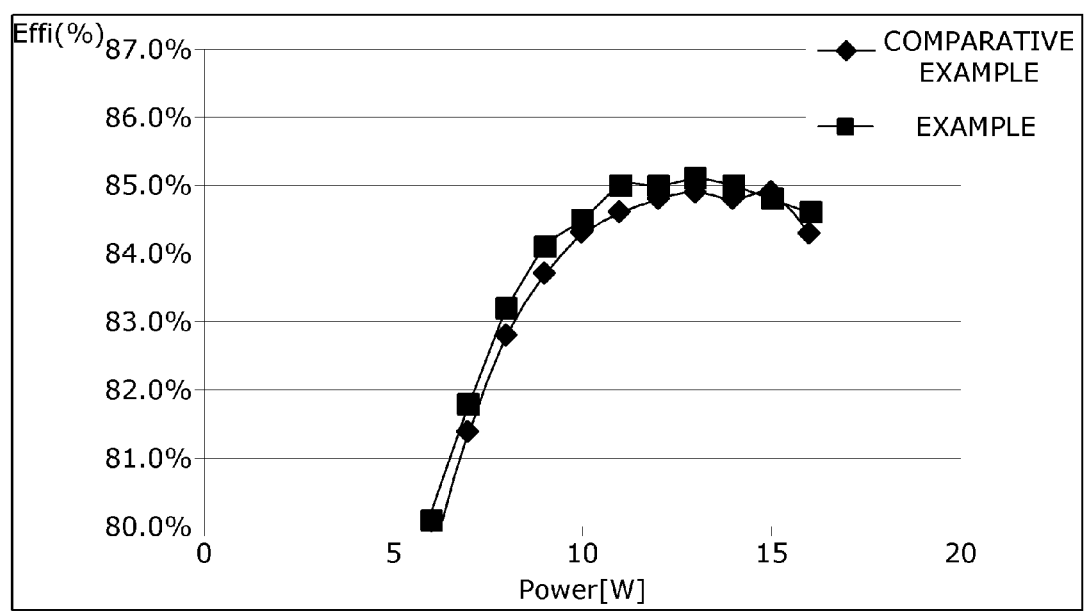

ANTENNA MODULE COMPRISING SHIELD LAYER AND WIRELESS POWER RECEIVING DEVICE

CROSS-REFERENCE TO RELATED PATENT APPLICATIONS

This application is a U.S. National Stage Application under 35 U.S.C. § 371 of PCT Application No. PCT/KR2019/001222, filed Jan. 29, 2019, which claims priority to Korean Patent Application No. 10-2018-0011306, filed Jan. 30, 2018, whose entire disclosures are hereby incorporated by reference.

TECHNICAL FIELD

The present invention relates to an antenna module, and more specifically, to a structure of a shield layer included in an antenna module.

BACKGROUND ART

Due to development of wireless communication technology, interest in wireless charging technology for wirelessly supplying power to electronic devices has increased. The wireless charging technology can be applied not only to battery charging of a portable terminal, but also to various types of power supply for household appliances, power supply for electric vehicles and subways, and the like.

General wireless power transmission and reception technology uses the principle of magnetic induction or magnetic resonance. For example, when electrical energy is applied to a transmission antenna of a wireless power transmission device, the transmission antenna can convert electrical energy to electromagnetic energy and radiate the electromagnetic energy to surroundings. Further, a receiving antenna of a wireless power receiving device can receive the electromagnetic energy radiated from the transmission antenna and convert the electromagnetic energy to electrical energy.

In this case, in order to increase power transmission and reception efficiency, it is necessary to minimize energy loss between the wireless power transmission device and the wireless power receiving device. To this end, it is necessary to align the transmission antenna and the receiving antenna within an effective distance. Further, it is necessary to dispose a shield layer around the transmission antenna and the receiving antenna to focus the electromagnetic energy radiated from the transmission antenna in a direction toward the receiving antenna.

FIG. 1 is one example of a wireless charging system.

Referring to FIG. 1, a wireless charging system 1 includes a wireless power transmission device 10 and a wireless power receiving device 20. The wireless power receiving device 20 includes a receiving coil 21, a shield layer 22, and a battery 23, and the receiving coil 21 of the wireless power receiving device 20 can be aligned with a transmission coil 11 of the wireless power transmission device 10.

A magnetic force flux generated between the transmission coil 11 and the receiving coil 21 does not occur uniformly, and can occur slightly at a center portion of the coil and can occur densely at an edge portion of the coil. Accordingly, the magnetic force flux through the shield layer 22 of the wireless power receiving device 20 tends to be concentrated to an edge of the shield layer 22, and accordingly, a load applied to the edge of the shield layer 22 may be greater than a load applied to a center portion of the shield layer 22.

Due to a difference between the load applied to the edge of the shield layer 22 and the load applied to the center portion of the shield layer 22, the power transmission and reception efficiency of the wireless power transmission device 10 and the wireless power receiving device 20 can be lowered.

DISCLOSURE

Technical Problem

The present invention is directed to providing a structure of a shield layer included in an antenna module.

Technical Solution

An antenna module according to one embodiment of the present invention includes: a coil layer including a wound first coil; a shield layer disposed on the coil layer and including a plurality of sequentially stacked magnetic sheets; and a protection layer disposed on the shield layer, wherein a thickness of an edge of the shield layer is greater than a thickness of a center of the shield layer, and a total separation distance between the plurality of magnetic sheets at the edge of the shield layer is greater than a total separation distance between the plurality of magnetic sheets at the center of the shield layer.

The thickness of the edge of the shield layer may be 1.05 to 1.3 times the thickness of the center of the shield layer.

Adhesive layers may be disposed between the plurality of magnetic sheets, and a total thickness of the adhesive layers at the edge of the shield layer may be greater than a total thickness of the adhesive layers at the center of the shield layer.

Permeability at the edge of the shield layer may be greater than permeability at the center of the shield layer.

The shield layer may include a first region including the center and a second region surrounding the first region and including the edge, the first coil may be disposed in the first region, and a width of the first region may be 0.2 to 0.8 times a total width of the shield layer.

The thickness of the shield layer may gradually increase from a boundary between the first region and the second region to the edge.

The plurality of magnetic sheets may include a first magnetic sheet disposed on the coil layer, a second magnetic sheet disposed on the first magnetic sheet, a third magnetic sheet disposed on the second magnetic sheet, and a fourth magnetic sheet disposed between the third magnetic sheet and the protection layer, a separation distance between the second magnetic sheet and the third magnetic sheet at the center of the shield layer may be 0.99 to 1.01 times a separation distance between the second magnetic sheet and the third magnetic sheet at the edge of the shield layer, and each of a separation distance between the first magnetic sheet and the second magnetic sheet at the edge of the shield layer and a separation distance between the third magnetic sheet and the fourth magnetic sheet at the edge of the shield layer may be greater than the separation distance between the second magnetic sheet and the third magnetic sheet at the edge of the shield layer.

The plurality of magnetic sheets may include at least one among sendust, metal ribbons, and ferrite.

At least one among the plurality of metal ribbons may be cracked.

The coil layer may further include a second coil disposed on the second region of the shield layer to surround a side surface of the first coil.

The first coil may include a wireless charging coil, and the second coil may include a coil for near field wireless communication.

A coil component according to one embodiment of the present invention includes a wireless power receiving device including: an antenna module; and a battery which charges power received through the antenna module, wherein the antenna module includes a coil layer including a wound first coil, a shield layer disposed on the coil layer and including a plurality of sequentially stacked magnetic sheets, and a protection layer disposed on the shield layer, a thickness of an edge of the shield layer is greater than a thickness of a center of the shield layer, and a total separation distance between the plurality of magnetic sheets at the edge of the shield layer is greater than a total separation distance between the plurality of magnetic sheets at the center of the shield layer.

Advantageous Effects

According to an embodiment of the present invention, an antenna module having high power transmission and reception efficiency and a wireless power receiving device including the same can be obtained. Specifically, since the permeability of the shield layer included in the antenna module according to the embodiment of the present invention is adjusted according to the magnetic flux, it is possible to maximize wireless power transmission and reception efficiency.

DESCRIPTION OF DRAWINGS

FIG. 1 is one example of a wireless charging system.

FIG. 2 is a block diagram illustrating a wireless charging system according to one embodiment of the present invention.

FIG. 3 is a view illustrating a portion of a wireless power transmission device, and FIG. 4 is a view illustrating a portion of a wireless power receiving device.

FIG. 5 is a cross-sectional view of an antenna module according to one embodiment of the present invention.

FIG. 6 is a cross-sectional view of a shield layer included in the antenna module according to one embodiment of the present invention.

FIGS. 7A and 7B are views for describing a permeability difference in the shield layer.

FIG. 8 illustrates a result of measuring transmission efficiency.

MODES OF THE INVENTION

Since the present invention may be variously changed and have various embodiments, particular embodiments will be exemplified and described in the drawings. However, the present invention is not limited to the particular embodiments and includes all changes, equivalents, and substitutes within the spirit and the scope of the present invention.

Further, it should be understood that, although the terms "second," "first," and the like may be used herein to describe various elements, the elements are not limited by the terms. The terms are only used to distinguish one element from another. For example, a first element could be termed a second element, and similarly, a second element could be termed a first element without departing from the scope of the present invention. The term "and/or" includes any one or any combination among a plurality of associated listed items.

When predetermined components are mentioned as being "linked," or "connected" to other components, the components may be directly linked or connected to other components, but it should be understood that additional components may be present therebetween. On the other hand, when the predetermined components are mentioned as being "directly linked," or "directly connected" to other components, it should be understood that no additional components are present between the above-described components.

Terms used in the present invention are used solely to describe the particular embodiments and not to limit the present invention. The singular form is intended to also include the plural form, unless the context clearly indicates otherwise. It should be further understood that the terms "include," "including," "provide," "providing," "have," and/or "having" specify the presence of stated features, integers, steps, operations, elements, components, and/or groups thereof but do not preclude the presence or addition of one or more other features, integers, steps, operations, elements, components, and/or groups thereof.

Unless otherwise defined, all terms including technical or scientific terms used in the present invention have meanings which are the same as those of terms generally understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the embodiments will be described in detail with reference to the accompanying drawing drawings, the same reference numerals are applied to the same or corresponding elements, and redundant description thereof will be omitted.

FIG. 2 is a block diagram illustrating a wireless charging system according to one embodiment of the present invention.

Referring to FIG. 2, the wireless charging system includes a wireless power transmission device 100 and a wireless power receiving device 200. The wireless power transmission device 100 applies electrical energy to a transmission antenna, and the transmission antenna converts the electrical energy to electromagnetic energy to radiate the electromagnetic energy to surroundings. The wireless power receiving device 200 receives the electromagnetic energy radiated from the transmission antenna using a receiving antenna, and converts the electromagnetic energy to electrical energy for charging.

Here, the wireless power transmission device 100 may be, for example, a transmission pad. Further, the wireless power receiving device 200 may be a part of a portable terminal, a household/personal appliance, a transportation means, or the like to which wireless power transmission and reception technology is applied. The portable terminal, the household/personal electronic products, and the transportation means, or the like to which the wireless power transmission and reception technology is applied may be set to include only the wireless power receiving device 200 or both the wireless power transmission device 100 and the wireless power receiving device 200.

Meanwhile, the wireless power receiving device 200 may be configured to include a module simultaneously having a wireless power transmission and reception (wireless power conversion: WPC) function and a near field wireless communication (NFC) function. In this case, the wireless power receiving device 200 may perform near field wireless communication with an external device 300 including an NFC module.

FIG. 3 is a view illustrating a portion of a wireless power transmission device, and FIG. 4 is a view illustrating a portion of a wireless power receiving device.

Referring to FIG. 3, the wireless power transmission device 100 may include a transmission circuit (not shown), a soft magnetic core 110, a transmission antenna 120, and a permanent magnet 130.

The soft magnetic core 110 may be formed of a several mm-thick soft magnetic material. Further, the transmission antenna 120 may be formed of a transmission coil, and the permanent magnet 130 may be surrounded by the transmission antenna 120. The permanent magnet 130 may be omitted according to the specifications.

Referring to FIG. 4, the wireless power receiving device 200 includes a receiving circuit (not shown), a soft magnetic layer 210, and a receiving coil 220. The soft magnetic layer 210 may be formed on a substrate (not shown). The substrate may be formed of a plurality of stacked fixed sheets, and may be bonded to the soft magnetic layer 210 to fix the soft magnetic layer 210.

The soft magnetic layer 210 focuses the electromagnetic energy radiated from the transmission antenna 120 of the wireless power transmission device 100. In the specification, the soft magnetic layer 210 may be used interchangeably with a shield layer.

The receiving coil 220 is formed on the soft magnetic layer 210. The receiving coil 220 may be wound on the soft magnetic layer 210 in a direction parallel to a plane of the soft magnetic layer 210. As an example of a receiving coil applied to a smart phone, the receiving coil may have a spiral coil shape having an outer diameter within 50 mm and an inner diameter of 20 mm or more. The receiving circuit converts the electromagnetic energy received through the receiving coil 220 to electrical energy, and charges a battery (not shown) with the converted electrical energy.

Although not shown, a heat dissipation layer may be further included between the soft magnetic layer 210 and the receiving coil 220. In the specification, the receiving coil 220 may be used interchangeably with a wireless charging coil. When the wireless power receiving device 200 simultaneously has the WPC function and the NFC function, an NFC coil 230 may be further disposed on the soft magnetic layer 210. The NFC coil 230 may be formed to surround the outside of the receiving coil 220.

Further, the receiving coil 220 and the NFC coil 230 may be electrically connected to each other through terminals 240.

According to the embodiment of the present invention, it is intended to provide a shield layer capable of maximizing wireless power transmission and reception efficiency by locally controlling permeability even when magnetic force flux varies according to the position.

FIG. 5 is a cross-sectional view of an antenna module according to one embodiment of the present invention, FIG. 6 is a cross-sectional view of a shield layer included in the antenna module according to one embodiment of the present invention, and FIG. 7 is a view for describing a permeability difference in the shield layer.

Referring to FIG. 5, an antenna module 500 includes a coil layer 510, a shield layer 520, and a protection layer 530. The antenna module 500 according to the embodiment of the present invention may be a part of the wireless power transmission device 100 or wireless power receiving device 200 described in FIGS. 2 to 4. For example, the coil layer 510 may include the transmission antenna 120 of the wireless power transmission device 100 or the receiving coil 220 of the wireless power receiving device 200, and the shield layer 520 may be the soft magnetic core 110 of the wireless power transmission device 100 or the soft magnetic layer 210 of the wireless power receiving device 200.

The coil layer 510 may include a coil wound in a spiral shape, but is not limited thereto, and may be wound in a quadrangular shape, an elliptical shape, or the like. Further, like the receiving coil 220 and the NFC coil 230 shown in FIG. 4, the coil layer 510 may include a wound first coil, and a second coil surrounding a side surface of the first coil and wound on the same plane as the first coil. Although not shown, a portion of the second coil may cross the first coil, and may be disposed along a portion of an inner surface of the first coil. According to the embodiment, a third coil surrounding the side surface of the first coil in the wound first coil, surrounding the side surface of the first coil and a side surface of the second coil at a space between the wound first coil and the wound second coil, or surrounding the side surface of the second coil at the outside of the wound second coil may be further disposed. The third coil may be, for example, a coil for magnetic secure transmission (MST).

Next, the shield layer 520 is disposed on the coil layer 510 and includes a plurality of sequentially stacked magnetic sheets. Here, each magnetic sheet may include at least one of sendust, a metal ribbon, and ferrite including Fe, Si, and Al. The metal ribbon may be, for example, an alloy ribbon including Fe, Si and B, or an alloy ribbon including Fe, Si, B, Cu, and Nb. When the magnetic sheet is the metal ribbon, the metal ribbon may crack in a predetermined pattern. Permeability of the metal ribbon may be controlled according to a cracking pattern or a particle size.

Each magnetic sheet may have a thickness of 100 μm or less, and the plurality of magnetic sheets may include two or more magnetic sheets. The protection layer 530 may be disposed on the shield layer 520, may support the shield layer 520, and may also discharge heat generated from the coil layer 510 and the shield layer 520 to the outside. The protection layer 530 may be, for example, a graphite sheet, but is not limited thereto.

Referring to FIG. 6, the shield layer 520 includes a plurality of sequentially stacked magnetic sheets 521, 523, 525, and 527. In this case, a thickness D1 of an edge of the shield layer 520 may be greater than a thickness D2 of a center of the shield layer 520. For example, the thickness D1 of the edge of the shield layer 520 may be 1.05 to 1.3 times, preferably 1.1 to 1.25 times, and more preferably 1.15 to 1.2 times the thickness D2 of the center of the shield layer 520.

For more specific description, referring to FIG. 7, FIG. 7A is a partially enlarged view of region A in FIG. 6, and FIG. 7B is a partially enlarged view of region B in FIG. 6. As shown in FIGS. 7A and 7B, a separation distance d1 between the first magnetic sheet 521 and the second magnetic sheet 523 at an edge B of the shield layer 520 may be greater than a separation distance d2 between the first magnetic sheet 521 and the second magnetic sheet 523 at a center B of the shield layer 520. Accordingly, a total separation distance between the plurality of magnetic sheets 521, 523, 525, and 527 at the edge of the shield layer 520 may be greater than a total separation distance between the plurality of magnetic sheets 521, 523, 525, and 527 at the center of the shield layer 520. Accordingly, the thickness D1 of the edge of the shield layer 520 may be greater than the thickness D2 of the center of the shield layer 520.

As shown in FIG. 7A, as the separation distance between the plurality of magnetic sheets 521, 523, 525, and 527 is smaller, the magnetic moment in each magnetic sheet tends to be disturbed, and as shown in FIG. 7B, as the separation distance between the plurality of magnetic sheets 521, 523, 525, and 527 is larger, the magnetic moment in each magnetic sheet tends to be uniformly aligned. When the magnetic moment in the magnetic sheet is disturbed, permeability of the magnetic sheets may be lowered, and when the magnetic moment in the magnetic sheet is uniformly aligned, the permeability of the magnetic sheets may increase.

Accordingly, when the shield layer 520 according to the embodiment of the present invention is used, greater permeability may be obtained at the edge of the shield layer 520 in comparison with the center of the shield layer 520. As described above, the magnetic force flux is densely distributed at the edge of the coil layer 510 in comparison with the center of the coil layer 510, and accordingly, greater permeability may be obtained at the edge of the shield layer 520 in comparison with the center of the shield layer 520. According to the embodiment of the present invention, since the permeability of the shield layer 520 may be controlled according to the magnetic force flux of the coil layer 510, it is possible to maximize the wireless power transmission and reception efficiency.

Referring to FIG. 6 again, the shield layer 520 may include a first region 600 including a center 602 and a second region 610 surrounding the first region 600 and including an edge 612. In this case, the coil layer 510 is disposed in the first region 600, and a width W1 of the first region 600 may be 0.2 to 0.8 times, preferably 0.3 to 0.7 times, and more preferably 0.4 to 0.6 times a total width W of the shield layer 520. In this case, a thickness of the shield layer 520 may gradually increase from a boundary between the first region 600 and the second region 610 to the edge 612. Accordingly, it is possible to optimally control the permeability of the shield layer 520 according to the magnetic force flux of the coil layer 510.

For example, the plurality of magnetic sheets 521, 523, 525, and 527 may include a first magnetic sheet 521 disposed on the coil layer 510, a second magnetic sheet 523 disposed on the first magnetic sheet 521, a third magnetic sheet 525 disposed on the second magnetic sheet 523, and a fourth magnetic sheet 527 disposed between the third magnetic sheet 525 and the protection layer 530, and a separation distance between the second magnetic sheet 523 and the third magnetic sheet 525 at the center 602 of the shield layer 520 may be substantially similar to a separation distance between the second magnetic sheet 523 and the third magnetic sheet 525 at the edge 612 of the shield layer 520. For example, the separation distance between the second magnetic sheet 523 and the third magnetic sheet 525 at the center 602 of the shield layer 520 may be 0.99 to 1.01 times the separation distance between the second magnetic sheet 523 and the third magnetic sheet 525 at the edge 612 of the shield layer 520. Accordingly, the plurality of magnetic sheets may be symmetrical in a vertical direction and may be stably supported. Here, although an example in which four magnetic sheets are stacked is described, the same may be applied even to a case in which four or more magnetic sheets are stacked. For example, when six magnetic sheets are sequentially stacked, a separation distance between a third stacked magnetic sheet and a fourth stacked magnetic sheet at the center of the shield layer may be substantially similar to a separation distance between the third stacked magnetic sheet and the fourth stacked magnetic sheet at the edge of the shield layer.

Further, each of the separation distance between the first magnetic sheet 521 and the second magnetic sheet 523 at the center 602 of the shield layer 520 and the separation distance between the third magnetic sheet 525 and the fourth magnetic sheet 527 at the center 602 of the shield layer 520 may be substantially similar to the separation distance between the second magnetic sheet 523 and the third magnetic sheet 525 at the center 602 of the shield layer 520. For example, each of the separation distance between the first magnetic sheet 521 and the second magnetic sheet 523 at the center 602 of the shield layer 520 and the separation distance between the third magnetic sheet 525 and the fourth magnetic sheet 527 at the center 602 of the shield layer 520 may be 0.99 to 1.01 times the separation distance between the second magnetic sheet 523 and the third magnetic sheet 525 at the center 602 of the shield layer 520. Further, each of the separation distance between the first magnetic sheet 521 and the second magnetic sheet 523 at the edge 612 of the shield layer 520 and the separation distance between the third magnetic sheet 525 and the fourth magnetic sheet 527 at the edge 612 of the shield layer 520 may be greater than the separation distance between the second magnetic sheet 523 and the third magnetic sheet 525 at the edge 612 of the shield layer 520. Accordingly, since the magnetic force flux is densely distributed at the edge of the coil layer 510 in comparison with the center of the coil layer 510, and thus needs of the shield layer requiring high permeability at the edge in comparison with the center may be satisfied, the wireless power transmission and reception efficiency may be maximized.

Alternatively, when the coil layer 510 includes the first coil and the second coil disposed to surround an outer circumferential surface of the first coil, the permeability required for a frequency characteristic of the first coil and the permeability required for a frequency characteristic of the second coil may be different. Accordingly, the first coil may be disposed in the first region 600, and the second coil may be disposed in the second region 610 in which the permeability is different from that of the first region 600. For example, the first coil may be a wireless charging coil, and the second coil may be a near field wireless communication (NFC) coil. Alternatively, the second coil may be an NFC coil, and the first coil may be a wireless charging coil. Accordingly, it is possible to optimally control the permeability of the shield layer according to the frequency characteristics of the first coil and the second coil.

Meanwhile, as shown in the embodiment of the present invention, in order to adjust the separation distances between the plurality of magnetic sheets 521, 523, 525, and 527 forming the shield layer 520, adhesive layers 529 may be disposed between the plurality of magnetic sheets 521. That is, the separation distances between the plurality of magnetic sheets 521, 523, 525, and 527 forming the shield layer 520 may be adjusted according to the thicknesses of the adhesive layers 529. The sum of total thicknesses of the adhesive layers 529 disposed at the edge 612 of the shield layer 520 may be greater than the sum of total thicknesses of the adhesive layers 529 disposed at the center 602 of the shield layer 520. As described above, when the adhesive layers 529 are disposed between the plurality of magnetic sheets 521, 523, 525, and 527, the separation distances between the plurality of magnetic sheets 521, 523, 525, and 527 may be stably maintained. In this case, in order to maintain the shielding performance of the shield layer 520, the adhesive layers 529 may include magnetic powder.

Hereinafter, the performance of the shield layer according to the embodiment of the present invention will be described using Comparative example and Example.

In order to manufacture the shield layer according to Comparative example and Example, nanocrystalline metal ribbons each having a size of 48 mm*48 mm having undergone a cracking process after thermal treatment were prepared.

In order to manufacture the shield layer according to Comparative example, the prepared metallic ribbons were stacked in four layers, and adhesive layers having a thickness of 5 µm were disposed between the metal ribbons.

In order to manufacture the shield layer according to Example, the prepared metal ribbons were stacked in four layers, a 5 µm-thick adhesive layer was disposed between the metal ribbons in a center region (a region having a size 25 mm*25 mm including the center), and a 10 µm-thick adhesive layer was disposed in an edge region (a region other than the center region).

In the shield layer according to Comparative example and the shield layer according to Example, after measuring inductance using an impedance analyzer, the inductance was converted to a permeability (µ) value, and transmission efficiency was measured using a 15 W Tx module. FIG. 8 illustrates a result of measuring transmission efficiency.

According to the measurement result, the inductance value was measured as 915.7 nH in the region where the 5 µm-thick adhesive layer was applied, the inductance value was measured as 933.5 nH in the region where the 10 µm-thick adhesive layer was applied, the permeability value was converted to 718.3µ in the region where the 5 µm-thick adhesive layer was applied, and the permeability value was converted to 732.3µ in the region where the 10 µm-thick adhesive layer was applied. Further, as shown in FIG. 8, it can be confirmed that the transmission efficiency of the shield layer manufactured according to Example is greater than the transmission efficiency of the shield layer manufactured according to Comparative example.

Although preferable embodiments of the present invention are described above, those skilled in the art may variously modify and change the present invention within the spirit and scope of the present invention disclosed in the claims which will be described below.

The invention claimed is:

1. An antenna module comprising:
a coil layer including a wound first coil;
a shield layer disposed on the coil layer and including a plurality of sequentially stacked magnetic sheets; and
a protection layer disposed on the shield layer,
wherein a thickness of an edge of the shield layer is greater than a thickness of a center of the shield layer, and
a total separation distance between the plurality of magnetic sheets at the edge of the shield layer is greater than a total separation distance between the plurality of magnetic sheets at the center of the shield layer.

2. The antenna module of claim 1, wherein the thickness of the edge of the shield layer is 1.05 to 1.3 times the thickness of the center of the shield layer.

3. The antenna module of claim 2, wherein:
adhesive layers are disposed between the plurality of magnetic sheets; and
a total thickness of the adhesive layers at the edge of the shield layer is greater than a total thickness of the adhesive layers at the center of the shield layer.

4. The antenna module of claim 3, wherein:
the adhesive layers include magnetic powder.

5. The antenna module of claim 3, wherein:
the total separation distance between the plurality of magnetic sheets is adjusted by the total thickness of the adhesive layers.

6. The antenna module of claim 1, wherein permeability at the edge of the shield layer is greater than permeability at the center of the shield layer.

7. The antenna module of claim 1, wherein:
the shield layer includes a first region including the center and a second region surrounding the first region and including the edge;
the first coil is disposed in the first region; and
a width of the first region is 0.2 to 0.8 times a total width of the shield layer.

8. The antenna module of claim 7, wherein the thickness of the shield layer gradually increases from a boundary between the first region and the second region to the edge.

9. The antenna module of claim 1, wherein:
the plurality of magnetic sheets include a first magnetic sheet disposed on the coil layer, a second magnetic sheet disposed on the first magnetic sheet, a third magnetic sheet disposed on the second magnetic sheet, and a fourth magnetic sheet disposed between the third magnetic sheet and the protection layer;
a separation distance between the second magnetic sheet and the third magnetic sheet at the center of the shield layer is 0.99 to 1.01 times a separation distance between the second magnetic sheet and the third magnetic sheet at the edge of the shield layer.

10. The antenna module of claim 9, wherein:
a separation distance between the first magnetic sheet and the second magnetic sheet at the edge of the shield layer is greater than the separation distance between the second magnetic sheet and the third magnetic sheet at the edge of the shield layer.

11. The antenna module of claim 9, wherein:
a separation distance between the third magnetic sheet and the fourth magnetic sheet at the edge of the shield layer is greater than the separation distance between the second magnetic sheet and the third magnetic sheet at the edge of the shield layer.

12. The antenna module of claim 9, wherein:
the first magnetic sheet and the fourth magnetic sheet are symmetrical with respect to the second magnetic sheet and the third magnetic sheet.

13. The antenna module of claim 1, wherein the plurality of magnetic sheets include at least one among sendust, metal ribbons, and ferrite.

14. The antenna module of claim 13, wherein at least one among the plurality of metal ribbons is cracked in a predetermined pattern.

15. The antenna module of claim 7, wherein the coil layer further includes a second coil disposed on the second region of the shield layer to surround a side surface of the first coil.

16. The antenna module of claim 15, wherein:
the first coil includes a wireless charging coil; and
the second coil includes a coil for near field wireless communication.

17. The antenna module of claim 15, wherein the coil layer further includes a third coil disposed around a side surface of the second coil.

18. The antenna module of claim 1, wherein the protection layer includes a graphite sheet.

19. A wireless power receiving device comprising:
an antenna module; and a battery which charges power received through the antenna module, wherein the antenna module includes a coil layer including a wound first coil, a shield layer disposed on the coil layer and including a plurality of sequentially stacked magnetic sheets, and a protection layer disposed on the shield layer, a thickness of an edge of the shield layer is greater than a thickness of a center of the shield layer, and a total separation distance between the plurality of magnetic sheets at the edge of the shield layer is greater than a total separation distance between the plurality of magnetic sheets at the center of the shield layer.

20. The wireless power receiving device of claim 19, wherein the thickness of the edge of the shield layer is 1.05 to 1.3 times the thickness of the center of the shield layer.

* * * * *